US009238969B2

(12) United States Patent
Batt et al.

(10) Patent No.: US 9,238,969 B2
(45) Date of Patent: Jan. 19, 2016

(54) TURBINE ASSEMBLY AND GAS TURBINE ENGINE

(75) Inventors: Stephen Batt, Lincoln (GB); Jonathan Mugglestone, South Normanton (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 410 days.

(21) Appl. No.: 13/876,595

(22) PCT Filed: Sep. 19, 2011

(86) PCT No.: PCT/EP2011/066186
§ 371 (c)(1), (2), (4) Date: Mar. 28, 2013

(87) PCT Pub. No.: WO2012/041728
PCT Pub. Date: Apr. 5, 2012

(65) Prior Publication Data
US 2013/0189110 A1 Jul. 25, 2013

(30) Foreign Application Priority Data
Sep. 29, 2010 (EP) .................................... 10182037

(51) Int. Cl.
*F01D 5/14* (2006.01)
*F03D 11/00* (2006.01)
*F04D 29/38* (2006.01)
(Continued)

(52) U.S. Cl.
CPC *F01D 5/30* (2013.01); *F01D 9/041* (2013.01); *F05D 2240/81* (2013.01); *F05D 2260/201* (2013.01)

(58) Field of Classification Search
CPC ............ F01D 5/30; F01D 9/04; F01D 9/041; F01D 9/042; F01D 5/147; F05D 2260/201; F05D 2240/81
USPC .............. 415/115–116, 175, 191, 200, 208.1, 415/209.3; 416/219 R, 231 B, 223 R
IPC ........................................................ F01D 5/18
See application file for complete search history.

(56) References Cited

U.S. PATENT DOCUMENTS 4,300,868 A 11/1981 Henshaw
4,616,976 A * 10/1986 Lings et al. .................. 415/115
(Continued)

FOREIGN PATENT DOCUMENTS

CN 1637235 A 7/2005
CN 101235728 A 8/2008
(Continued)

*Primary Examiner* — Thai Ba Trieu

(57) ABSTRACT

A turbine arrangement includes first and second platforms forming a section of a main fluid path, aerofoils, and an impingement plate. Each aerofoil extends from the first to the second platform. The second platform has a surface opposite to the main fluid path with recesses surrounded by a raised edge, which provides support for the mountable impingement plate. The edge is formed as a first closed loop surrounding a first recess and further surrounding a first aperture of a first aerofoil and as a second closed loop surrounding a second recess and further surrounding a second aperture of a second aerofoil. A portion of the edge defines a continuous barrier between the first recess and the second recess for blocking cooling fluid. The barrier forms a mating surface for a central area of the impingement plate.

13 Claims, 4 Drawing Sheets

(51) Int. Cl.
*B64C 11/16* (2006.01)
*F01D 5/30* (2006.01)
*F01D 9/04* (2006.01)

(56) References Cited

U.S. PATENT DOCUMENTS

| | | | | | |
|---|---|---|---|---|---|
| 4,767,261 | A * | 8/1988 | Godfrey et al. | ............... | 415/115 |
| 5,743,708 | A | 4/1998 | Brown | | |
| 6,632,070 | B1 | 10/2003 | Tiemann | | |
| 6,648,597 | B1 * | 11/2003 | Widrig et al. | ................. | 415/200 |
| 7,360,769 | B2 | 4/2008 | Bennett | | |
| 8,296,945 | B2 | 10/2012 | Broomer et al. | | |
| 2006/0067817 | A1 * | 3/2006 | Motherwell et al. | .......... | 415/191 |
| 2009/0016873 | A1 * | 1/2009 | Bridges et al. | ............ | 416/231 B |
| 2009/0165301 | A1 | 7/2009 | Broomer et al. | | |
| 2010/0054932 | A1 * | 3/2010 | Schiavo | ........................ | 415/200 |
| 2012/0076660 | A1 * | 3/2012 | Spangler et al. | .......... | 416/223 R |
| 2012/0201667 | A1 * | 8/2012 | Butler | ........................ | 415/208.1 |
| 2013/0189092 | A1 * | 7/2013 | Dube et al. | .................... | 415/200 |
| 2014/0219788 | A1 * | 8/2014 | Nilsson | ......................... | 415/175 |
| 2014/0255200 | A1 * | 9/2014 | Guo et al. | ................. | 416/231 R |
| 2015/0016972 | A1 * | 1/2015 | Freeman et al. | .............. | 415/175 |
| 2015/0016973 | A1 * | 1/2015 | Mugglestone | ................ | 415/175 |

FOREIGN PATENT DOCUMENTS

| | | | | | |
|---|---|---|---|---|---|
| CN | 101825002 | A | 2/2010 | | |
| CN | 101769171 | A | 7/2010 | | |
| DE | 102008055574 | A1 | 7/2009 | | |
| EP | 1132574 | A2 | 9/2001 | | |
| EP | 1548235 | A2 | 6/2005 | | |
| FR | 2316440 | A1 | 1/1977 | | |
| GB | 1605220 | A * | 8/1984 | ................ | F01D 5/18 |
| RU | 2171381 | C2 | 7/2001 | | |
| RU | 2369749 | C1 | 10/2009 | | |

* cited by examiner

TURBINE ASSEMBLY AND GAS TURBINE ENGINE

CROSS REFERENCE TO RELATED APPLICATIONS

This application is the US National Stage of International Application No. PCT/EP2011/066186, filed Sep. 19, 2011 and claims the benefit thereof. The International Application claims the benefits of European application No 10182037.1 EP filed Sep. 29, 2010. All of the applications are incorporated by reference herein in their entirety.

FIELD OF THE INVENTION

The invention relates to turbine assembly of a turbomachine, particularly a gas turbine engine.

BACKGROUND OF THE INVENTION

In a conventional gas turbine engine, gases, e.g. atmospheric air, are compressed in a compressor section of the engine and then flowed to a combustion section in which fuel is added, mixed and burned. The now high energy combustion gases are then guided to a turbine section where the energy is extracted and applied to generate a rotational movement of a shaft. The turbine section includes a number of alternate rows of non-rotational stator vanes and moveable rotor blades. Each row of stator vanes directs the combustion gases to a preferred angle of entry into the downstream row of rotor blades. The rows of rotor blades in turn will carry out a rotational movement resulting in revolving of at least one shaft which may drive a rotor within the compressor section and/or a generator.

A known nozzle guide vane assembly of a turbine section of a gas turbine engine may comprise a circumferentially extending array of angularly spaced apart aerofoils. Inner and outer platform members are separate from the aerofoils and each platform members may comprise an inner and outer skin. The skins may have aerofoil shaped apertures through which the aerofoils project. The inner skin serves to define a respective boundary of the gas flow through the assembly. The outer skin may be provided with a large number of impingement cooling apertures as high temperatures may occur within the turbine section. By causing cooling fluid at high pressure to flow through these apertures and to impinge upon the inner skin an efficient cooling of the inner skin may be provided. A nozzle guide vane like this is defined in U.S. Pat. No. 4,300,868.

The reason for cooling is that due to the very high temperatures in the turbine flow duct. The surface of the platform exposed to the hot gas is subjected to severe thermal effects. In order to cool the platform, a perforated wall element may be arranged in front of the surface of the platform facing away from the hot gas. Cooling air enters via the holes in the wall element and hits the surface of the platform facing away from the hot gas. This achieves efficient impingement cooling of the platform material.

Besides the platforms, it is common also to cool aerofoils, e.g. by injecting cooling air into a hollow interior of an aerofoil.

A ring of guide vanes may be arranged by a plurality of guide vane segments. A segment comprising the inner platform, the outer platform and at least one aerofoil may be cast as a single piece. A plate for impingement as a separate piece may later be assembled to the cast segment.

Alternatively, according to U.S. Pat. No. 6,632,070 B1, also the platform may comprise several pieces. The platform may have a so called separating region, which is embodied as a separate component. The separating region may be arranged with a plurality of cooling pockets, covered by an impingement cooling sheet with impingement cooling openings, such that cooling air jets can hit the surface of the cooling pockets.

A further implementation showing cooling pockets in which impingement cooling takes place and from which the cooling air is guided away via film cooling holes is disclosed in FR 2 316 440 A1 or the corresponding application DE 26 28 807 A1.

According to U.S. Pat. No. 5,743,708 A, an impingement plate may rest on a steps of a nozzle segment. For each aerofoil a separate nozzle segment seems to be required. A plurality of impingement plates are provided for each nozzle segment to individually be placed in a plurality of compartments. The compartments are separated by internal railings that have openings to be in fluid communication with one another. The rim of the aerofoil fluid inlet or fluid outlet is elevated such that the inlet projects over the impingement plates and such that small through holes are present through the rim to allow impingement fluid from the compartments to enter the hollow aerofoil. It is apparent that a large number of small sections of impingement plates need to be assembled.

Further turbine airfoil arrangements are known from DE 10 20087 055 574 A1 and EP 1 548 235 A2 which both show turbine airfoil arrangement segments that comprise two aerofoils on a monolithic segment.

It is an object of the invention to provide cooling features for a turbine nozzle segment such that cooling of aerofoils and platforms will happen reliably. Furthermore it is an additional goal to have a fairly simple design which is easy to be assembled.

SUMMARY OF THE INVENTION

The present invention seeks to mitigate these drawbacks.

This objective is achieved by the independent claims. The dependent claims describe advantageous developments and modifications of the invention.

In accordance with the invention there is provided a turbine assembly comprising a first platform, a second platform, a plurality of aerofoils, and an impingement plate. Each of the plurality of aerofoils extends between the first platform—or shroud—and the second platform—or shroud—the first and second platform forming a section of a main fluid path. Particularly, the invention may be directed to a turbine vane assembly or a turbine vane segment, wherein a plurality of segments forming an annular duct comprising an array of aerofoils, a hot working fluid passing through the duct being in contact to the platforms and the aerofoils. According to the invention the second platform has a surface opposite to the main fluid path with a plurality of recesses, the recesses surrounded by a raised edge or flange, the edge providing a support for the mountable impingement plate. The edge is formed as a first closed loop surrounding a first recess of the plurality of recesses and further surrounding a first aperture of a first aerofoil of the plurality of aerofoils and as a second closed loop surrounding a second recess of the plurality of recesses and further surrounding a second aperture of a second aerofoil of the plurality of aerofoils, such that a portion of the edge defines a continuous barrier between the first recess and the second recess for blocking cooling fluid, and such that the barrier forms a mating surface for a central area of the impingement plate.

The barrier can be consider to be a flow blocker or a cross flow blocker or a fluid barrier for completely blocking a flow of cooling fluid which may otherwise would happen along a surface of the second platform. Thus, the barrier is separating the first recess and the second recess from each other.

"closed loop" is meant in the sense that in the edge no apertures, passages, or cut-outs are present.

When assembled the impingement plate may be mounted on top of the edge. The edge may have a flat surface, wherein the flat surface is located in a cylindrical plane to form a mating surface for the impingement plate.

Thus, the edge may be continuously in contact with the mating impingement plate. The edge may be level.

The impingement plate may be arranged such that surfaces of the plurality of recesses are coolable via impingement cooling during operation. The impingement plate may provide a plurality of small holes through which cooling fluid—particularly cooling air—can pass such that they will hit the opposing surface in a substantially perpendicular direction.

The impingement plate may particularly be sized that a single piece impingement plate may cover both the first recess and the second recess.

As defined previously, the turbine assembly may particularly a multiple aerofoil segment, e.g. with two aerofoils per segment. In other words, the first platform, the second platform and the plurality of aerofoils may be build as a single piece turbine nozzle guide vane segment.

On such multiple vane segments, especially when the platform impingement fluid is furthermore used to additionally cool the aerofoils from inside, the flow split to each aerofoil typically is difficult to control or predict. This is improved by the inventive turbine assembly with a barrier that restricts an impingement fluid provided to the first recess to continue its flow into an aperture for the first aerofoil but disallows a cross flow to an aperture for the second aerofoil.

The invention is advantageous especially for configurations in which an aerofoil impingement tube within an aerofoil has no independent source of cooling fluid and/or there are no extra passages to exhaust the cooling fluid provided via the impingement plate after impinging the to be cooled surface into the main fluid path.

According to the invention the barrier forms a mating surface for a central area of the impingement plate. As a consequence the barrier can act as an additional support to the impingement plate avoiding collapsing of the impingement plate. Considering a substantially flat cuboid shape of the impingement plate which may later follow the form of a cylindrical segment once assembled to the turbine assembly, the central area of the impingement plate may be an area substantially half distance of the length between two opposing ends of the cuboid.

It has to be noted that the impingement plate may be substantially flat, e.g. formed from sheet metal, but this should not mean that no extensions like ribs can be present. It may have local pressed indentions, e.g. to make it stiffer. A stiffening rib may vary the impingement height slightly in comparison to a totally flat impingement plate.

In a further preferred embodiment, the first recess may comprise at least one first aperture for cooling an interior of the first aerofoil and/or the second recess may comprise at least one second aperture for cooling an interior of the second aerofoil. The first aperture may have an elevated first rim, the first rim being configured with a height less than a height of the edge, and/or the second aperture may have an elevated second rim, the second rim being configured with a height less than a height of the edge. The height may be defined as a distance from a surface of the respective recess to the top surface of the rim or the edge, respectively, the distance is measured in a direction perpendicular to the surface of the recess. Once assembled in a gas turbine engine, the height represents a radial distance taken in direction of the axis of rotation.

With this feature the impinged cooling fluid may continue to flow into the interior of the hollow aerofoils for cooling these aerofoils. Additionally the impingement plate may provide holes with a larger diameter than the impingement holes, opposite to the apertures of the aerofoils, so that further, non-impingement fluid can also be provided to the interior of the aerofoils. Thus, cooling fluid directly provided to the aerofoils and impinged cooling fluid will be mixed.

As previously said, the turbine assembly is particularly an annular turbine nozzle guide vane arrangement. The first platform may be configured substantially in form of a section of a first cylinder and the second platform may be configured substantially in form of a section of a second cylinder, the second cylinder being arranged coaxially to the first cylinder about an axis. The first and the second platforms may each have an axial dimension and a circumferential dimension or expansion, i.e. they are spanned in axial and circumferential direction.

The first and the second platforms each may even form sections of truncated cones. The cones may be arranged coaxially.

Possibly a platform may not even have a flat surface but the two platforms may show a convergent section followed in axial direction by a divergent section. In other implementations the two platforms may be continuously divergent in axial direction. All these implementations may be considered to fall under the scope of the invention even though in the following maybe only the simplest of these configurations is explained.

The edge, on which the impingement plate will rest, may particularly comprise a first elevation in circumferential direction and a second elevation in circumferential direction and a third elevation in axial direction and a fourth elevation in axial direction, all forming a mating surface for a border area of the impingement plate. With border area a rectangular area on the largest surface of the impingement plate is meant that starts at the narrow end faces of the impingement plate and continues a short distance along that surface.

In a preferred embodiment, the barrier may be directed substantially in axial direction and forming a mating surface for a central area of the impingement plate. Once the impingement plate is assembled to the second platform, the barrier will block the impinged fluid flow from one recess to another. Particularly, the barrier may comprise a bend, the bend being substantially parallel to an orientation of the first aerofoil and/or of the second aerofoil.

In one embodiment, the second platform may comprise a first flange in direction of a first axial end of the second platform and a second flange in direction of a second axial end of the second platform, the barrier substantially spanning between the first flange and the second flange. Additionally, the impingement plate may occupy all space between the two flanges.

As already previously indicated, besides to control the cooling fluid flow, the edge may provide support to the impingement plate. In a preferred embodiment, the edge may provide the only support to the impingement plate. No further ribs may be present in the area of the recesses that will be in contact with the impingement plate. In other words, the edge is configured such that the impingement plate, once assembled to the second platform, is continuously elevated in regards of the recesses to create a plenum chamber for impingement cooling, besides at the supporting edges.

The invention is also directed to a complete turbine nozzle, comprising a plurality of the inventive turbine assemblies. Furthermore the invention is directed to a complete turbine section of a gas turbine engine comprising at least turbine nozzle with a plurality of the inventive turbine assemblies. Besides, the invention is also directed to a gas turbine engine, particularly a stationary industrial gas turbine engine, that comprises at least one guide vane ring comprising a plurality of turbine assemblies as explained before.

In a preferred embodiment, during operation of such a gas turbine engine, a first space or plenum defined by the first recess and an opposing impingement plate may be in fluid communication with a hollow body of the first aerofoil and a second space defined by the second recess and the opposing impingement plate may be in fluid communication with a hollow body of the second aerofoil.

The fluid communication will be realised such that during operation an impingement cooling fluid directed to the first recess via holes of one of the impingement plates continues to flow into the hollow body of the first aerofoil.

The first space and/or the second space may be substantially free of passages through the second platform into the main fluid path such that the complete amount of impinged cooling fluid will eventually enter the hollow body of the first aerofoil.

It has to be mentioned again, that in a preferred embodiment a single impingement plate will cover the first recess and the adjacent second recess.

Even though most of the features have been explained for the second platform which may be a radial outer platform, the features may alternatively or additionally be applied to the radial inner platform.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other noti-fied, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying drawings, of which.

The illustration in the drawing is schematical. It is noted that for similar or identical elements in different figures, the same reference signs will be used.

Some of the features and especially the advantages will be explained for an assembled gas turbine, but obviously the features can be applied also to the single components of the gas turbine but may show the advantages only once assembled and during operation. But when explained by means of a gas turbine during operation none of the details should be limited to a gas turbine while in operation.

In the following the terms “inner” and “outer”, “upstream” and “downstream” will be used, even though these terms may only make sense in an assembled and/or operating gas turbine. Considering a gas turbine with an axis of rotation about which rotor parts will revolve “inner” should mean radial inwards in direction to the axis, “outer” should mean radial outwards in direction leading away from the axis. “upstream” or “leading” will be used in regards of the main fluid flow for parts that are hit by the main fluid before parts that are located “downstream” or in a “trailing” location. When talking about the turbine section, an axial direction may coincide with a downstream direction of the main fluid flow.

DETAILED DESCRIPTION OF THE INVENTION

Figure 1A:
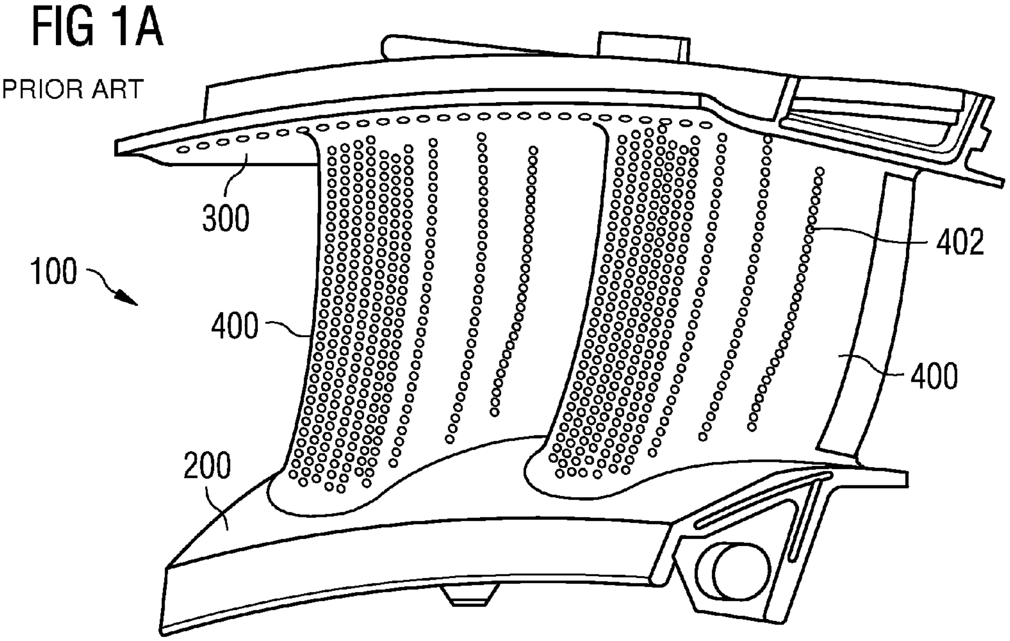
FIG 1A PRIOR ART
FIGS. 1A and 1B: are perspective views of two different types of turbine vane assemblies according to the prior art.

Referring now to FIG. 1A, taken from US patent publication U.S. Pat. No. 7,360,769 B2, a turbine vane arrangement 100 is shown, comprising two aerofoils 400, a first platform 200, and a second platform 300. According to the figure they appear to be built as one piece, possibly by casting.

During operation, air for cooling may be provided to a hollow interior of the aerofoils 400. Cooling features may be present in the interior of the aerofoils 400. The air may exit via a plurality of cooling holes 402 that may provide film cooling to the outer shell of the aerofoils 400. A portion of the air may also be discharged from the airfoil in the trailing edge region.

Figure 1B:
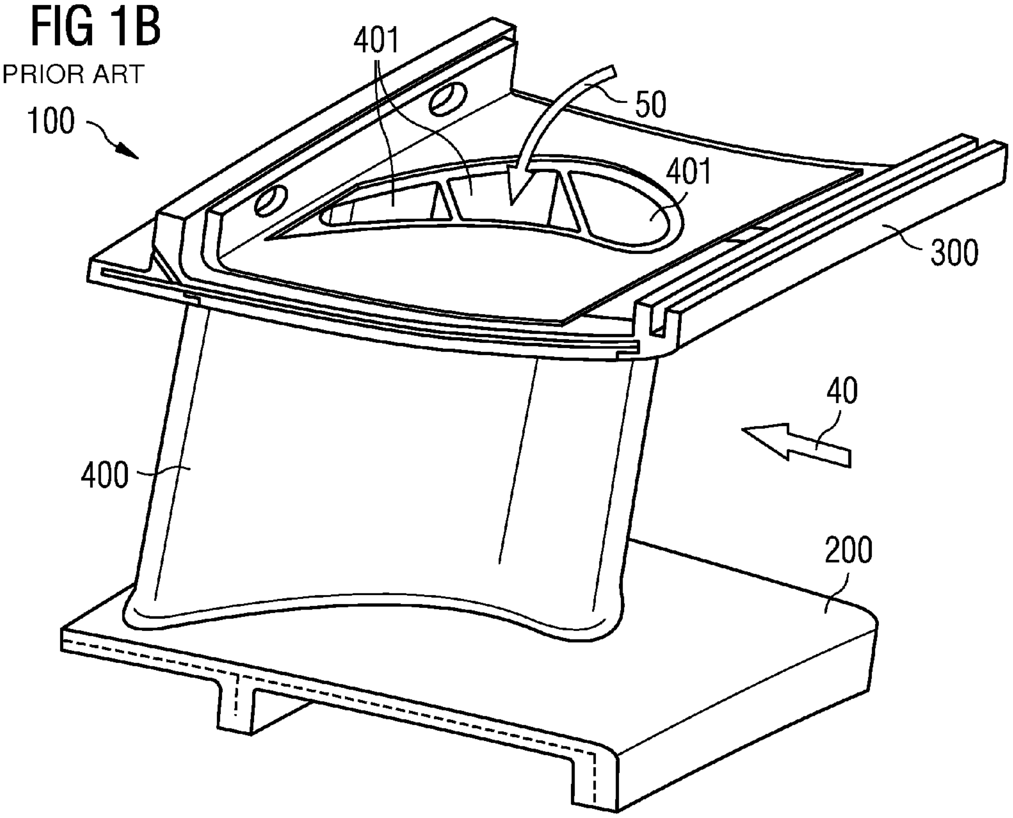
FIG 1B PRIOR ART

FIG. 1B shows a different type of turbine vane arrangement 100 as disclosed in US 2010/0054932 A1 with only a single aerofoil 400. The turbine vane arrangement 100 furthermore comprises a first platform 200 and a second platform 300. The second platform 300 has three apertures 401 which provide an inlet to a hollow interior of the aerofoil 400 for cooling air. The cooling fluid flow is indicated via arrow 50. A main fluid flow 50 of a burnt and accelerated air and gas mixture is indicated via arrow 40.

Figure 2:
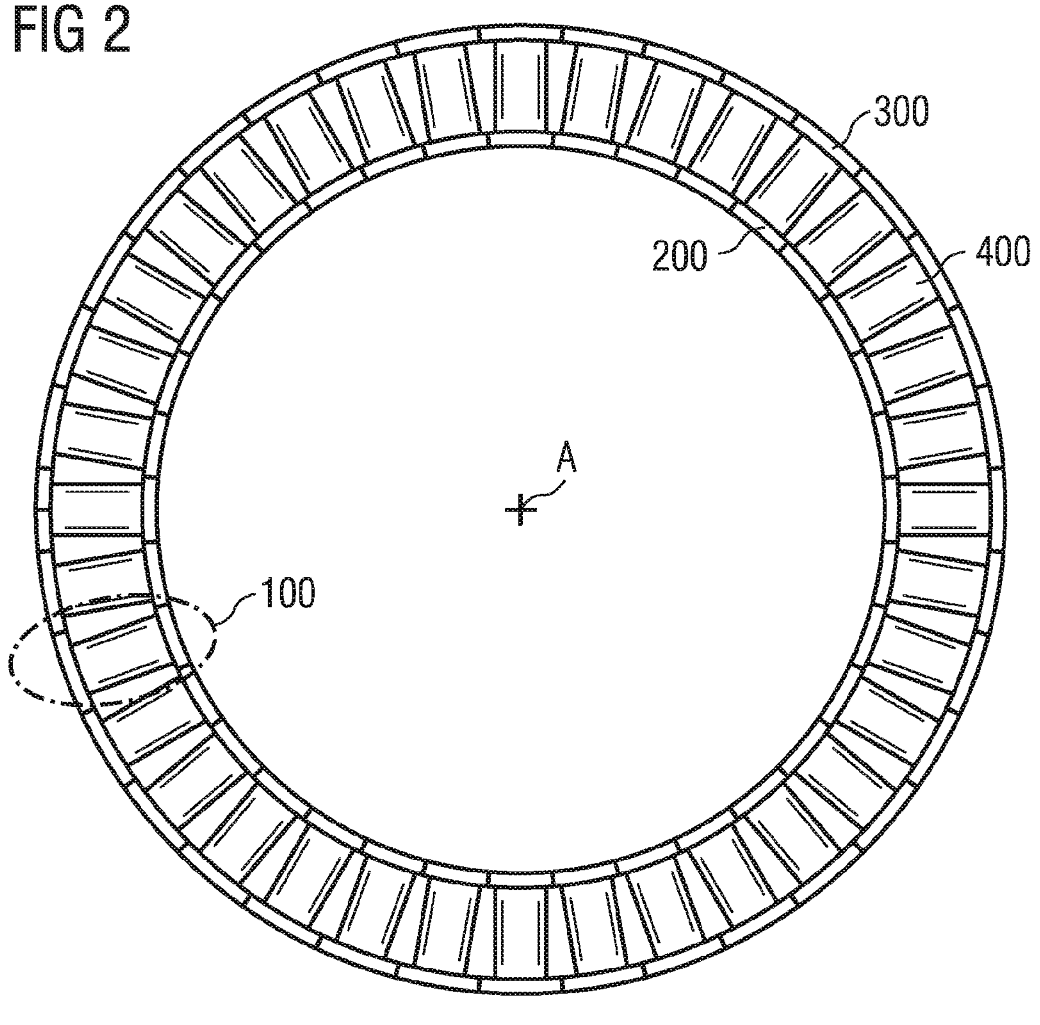
FIG. 2: illustrates a circular array of turbine vane assemblies.

The turbine assemblies 100 according to FIGS. 1A and 1B are built as a segment of an annular fluid duct. FIG. 2 shows a plurality of these segments as defined in FIG. 1B arranged about an axis A of a turbine section of a gas turbine engine from an axial point of view. Axis A will be perpendicular to the drawing plane. As you will see in FIG. 2, the first platform 200—being a radially inward platform—and the second platform—being a radially outward platform—look like concentric circles. The plurality of turbine assemblies 100 form an annular channel, via which the main fluid will pass.

Figure 3:
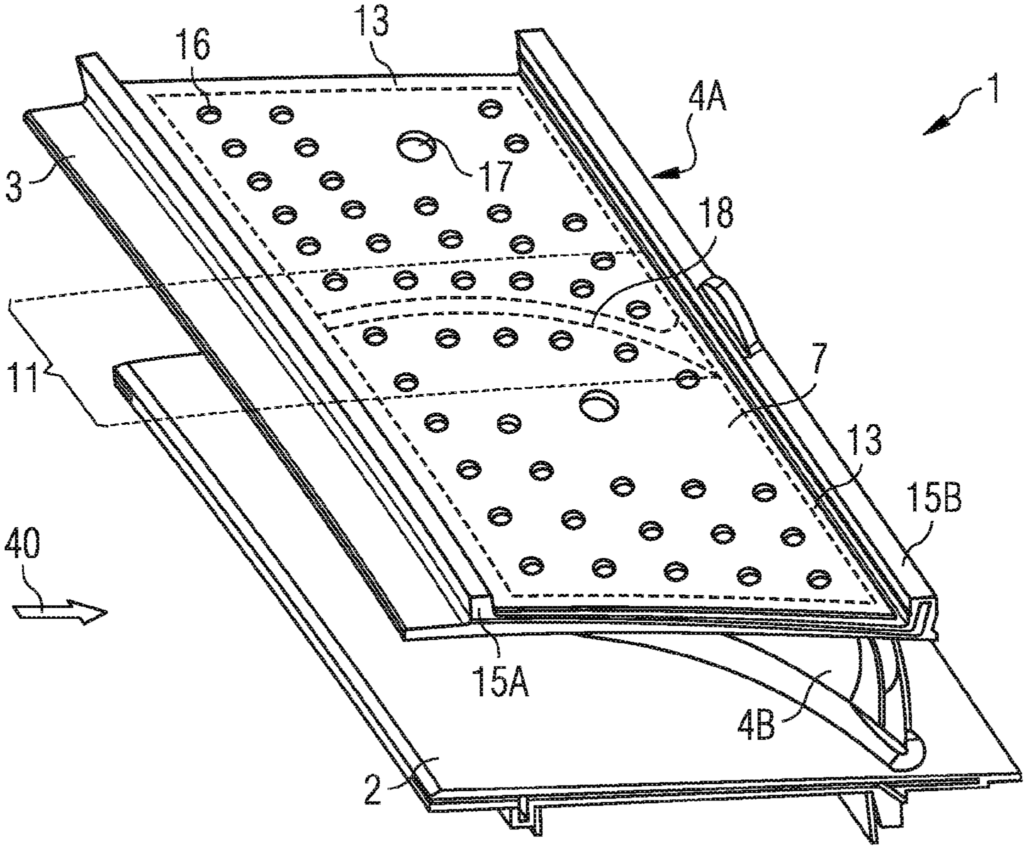
FIG. 3: showing a perspective view of a turbine vane arrangement according to the invention together with an impingement plate.
Figure 4:
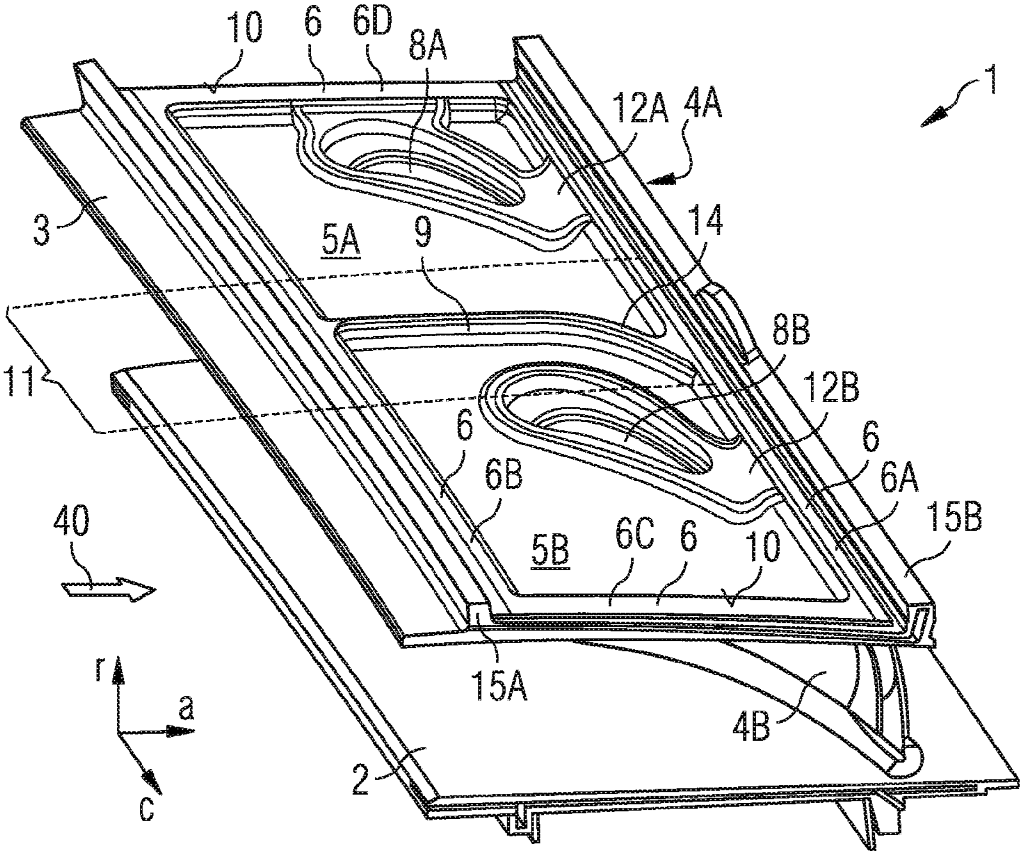
FIG. 4: showing a perspective view of a turbine vane arrangement according to the invention without an impingement plate.

Based on the configurations of FIGS. 1 and 2 an inventive nozzle vane segment 1 as a turbine assembly according to the invention is shown in a perspective view in FIGS. 3 and 4. The shown nozzle vane segment 1 is based on a configuration as disclosed in FIG. 1, being cast with a first platform 2, a second platform 3, and two aerofoils, a first aerofoil 4A—which is only indicated in FIG. 4 via an aperture 8A in form of an aerofoil—and a second aerofoil 4B. As before, the nozzle vane segment 1 is a section of a turbine vane stage which will be assembled to a complete annular ring, similar to the one shown in FIG. 2.

In FIG. 3 a configuration of the nozzle vane segment 1 is shown with an attached impingement plate 7, as it will look like when assembled. FIG. 4 illustrates the very same nozzle vane segment 1 without the attached impingement plate 7. Thus, in the following, all said does apply to both FIGS. 3 and 4.

A main fluid flow is indicated by arrow 40 with the consequence that leading edges of the aerofoils 4A, 4B will be on the left—not visible in the figures—and trailing edges of the aerofoils 4B, 4B on the right—only the trailing edge of aerofoil 4B is visible in the figures.

Coordinates are indicated in FIG. 4 via vectors a, c, r. Vector a represents an axial direction parallel to an axis of rotation—indicated by A in FIG. 2—of an assembled gas turbine. Vector r representing a radial direction taken from that axis of rotation. Vector c represents a circumferential direction orthogonal to the axial and radial direction.

In the following, the focus is on the second platform 3, which is a radially outer platform. Most of what is said can be also applied, additionally or alternatively, to the first platform 2, a radially inner platform.

The second platform 3 comprises a first flange 15A and a second flange 15B. Possibly these flanges 15A and 15B may define the axial space available for the impingement plate 7.

A surface of the second platform 3 opposite to the main fluid path, as it is shown in FIG. 4 comprises a first recess 5A and a second recess 5B, the recesses 5A, 5B surrounded by a raised edge 6. The edge 6 is providing a support for a mountable impingement plate 7. The edge 6 comprises sections arranged parallel and adjacent to the flanges 15A, 15B. Further sections of the edge 6 will be along both circumferential ends of the second platform 3. Furthermore a barrier 9 will be part of the edge 6, being a dividing wall for the recesses 5A and 5B and substantially forming an axial connection between the flanges 15A and 15B.

The edge 6 is formed as a first closed loop surrounding the first recess 5A and further surrounding a first aperture 8A of a first aerofoil 4A, the first aperture 8A being an inlet for cooling fluid for the interior of the first aerofoil 4A. The edge 6 additionally is formed as a second closed loop surrounding the second recess 5B and further surrounding a second aperture 8B of a second aerofoil 4B. One part of each of the closed loop is a common wall between the recesses 5A and 5B, the barrier 9. The barrier 9 particularly has no gaps, holes, recesses but being configured as a continuous barrier 9 between the first recess 5A and the second recess 5B for blocking cooling fluid that would otherwise flow along the surfaces of the recesses 5A, 5B.

The edge 6 is providing a flat edge surface 10 on top of the edge, such that the impingement plate 7 will rest upon this flat surface. The barrier 9 has a same radial height as the other portions of the edge 6. Therefore the barrier 9 seals a plenum above the first recess 5A from a further plenum above the second recess 5B so that cross cooling fluid flow is blocked. Furthermore the barrier 9 provides a support to the impingement plate 7 in a more central area of the impingement plate 7. This supports the stability of the impingement plate 7.

The parts of the impingement plate 7 that will be in direct contact with the second platform 3 are framed by a dashed line in FIG. 3, the sections close to the border of the impingement plate 7 being a border area 13. The area of support via the barrier 9 is indicated by barrier contact area 18, again visualised by dashed lines.

The first closed loop of the edge 6 comprises a part of a first elevation 6A, the barrier 9, a part of a second elevation 6B, and a fourth elevation 6D. The second closed loop of the edge 6 comprises of a part of the first elevation 6A, a third elevation 6C, a part of the second elevation 6B, and the barrier 9. The first and the second elevations 6A, 6B are ridges in circumferential direction c near the flanges 15A and 15B. The third and the fourth elevations 6C, 6D are ridges in axial direction a along the circumferential ends of the nozzle vane segment.

It has to be noted that no further passage is present from the recesses 5A, 5B through the second platform 3 or between two adjacent platforms 3 into the main fluid path. Furthermore it should be considered that no cooling fluid can pass into the main fluid path via axial ends of the second platform 3. All impinged cooling fluid, after impinging the surfaces of the recesses 5A, 5B will continue its flow into the apertures 8A or 8B of the aerofoils 4A, 4B. The first aperture 8A may be framed by a first rim 12A, the second aperture 8B may be framed by a second rim 12B. The radial heights of these rims 12A, 12B are less than the radial height of the edge 6 or the barrier 9, so that the impingement plate 7 will not be in physical contact with the rims 12A, 12B. There will be space between the rims 12A, 12B and the impingement plate 7 so that impinged cooling fluid can pass over the rims 12A, 12B into apertures 8A, 8B and further into the hollow interior of the aerofoils 4A, 4B.

The impingement plate 7 may comprise a plurality of impingement holes 16. Besides, larger holes may be present as inlet 17 specifically for inner vane cooling. Thus cooling fluid provided via inlet 17 will mix with impinged cooling fluid redirected from the surfaces of the recesses 5A, 5B.

It has to be noted that a single cooling fluid supply having a common source of cooling air may be present that will affect all holes 16 and all inlets 17. No independent cooling fluid supply may be present for the holes 16 and for the inlets 17. Optionally independent cooling fluid supply may be present.

The barrier 9 allow to control the fluid flow of the cooling fluid, as the barrier blocks all cooling fluid parallel to the surfaces of the recesses 5A, 5B. The barrier 9 may particularly be located in a central area 11, as indicated in by dashed lines. This central area 11 is substantially in the area at half distance of the circumferential length of the nozzle vane segment 1. It is a circumferential mid portion.

The barrier 9 may be completely straight, particularly in axial direction. In another implementation, as shown in FIG. 4, the barrier 9 may be substantially straight section, followed downstream—as seen from the main fluid flow—by a bend 14 of the barrier 9. Thus the barrier 9 may be curved, which may correspond substantially to the form of the aerofoils 4A, 4B and the apertures 8A, 8B.

With the turbine nozzle vane segment the problem can be addressed that the impingement plate is subjected to loading from air pressure and loss of material properties due to high temperature. Regarding "loading", generally an impingement plate has air at a high pressure on the outer side, and lower pressure on the side closest to the nozzle. The difference in air pressure may result in the loading. The term "loading" is used in relation to the forces arising from the pressure differential either side of the plate. As a consequence of the forces a bending of the plate in the direction of the nozzle could occur, but this bending may be overcome by the invention. Regarding "loss of material properties" relates to the reduction in material strength due to high temperatures. It has to be noted that the turbine nozzle and surrounding components are at an elevated temperature due to combustion gases. Because of that the impingement plate is also at a higher temperature. The material of the impingement plate is generally weaker due to this higher operating temperature.

Without the invention the impingement plate may prone to collapse when being poorly supported above a single plenum. On multiple vane segments like shown in FIGS. 3 and 4 with the platform impingement air used to cool the aerofoils, the flow split to each aerofoil may be difficult to control and/or predict. In prior art configuration, the vane impingement tube may have an independent source of air. The cooling air flow from the impingement plate may be exhausted directly to the main gas flow. This allows sufficient support to the impingement plate by design.

According to the preferred embodiment according to FIGS. 3 and 4, the barrier 9 as a central support between aerofoils on the nozzle segment casting may be implemented for support to the impingement plate 7 and for more controllable flow distribution feeding the individual aerofoils 4A, 4B. This design allows for better impingement plate support and more controlled flow distribution.

Even though not shown in the figures, the embodiments of the invention do not exclude the presence of film cooling apertures in the second platform 3, which would then divert a small portion of the air entering the recesses 5A, 5B through the impingement plate to cool a surface of the main fluid path of the platform 3.

Preferably the first platform 2, the second platform 3 and the plurality of aerofoils 4A, 4B are build as a single piece turbine nozzle guide vane segment. This turbine nozzle guide vane segment may particularly be cast. A plurality of these turbine nozzle guide vane segments will form a whole annulus of the gas turbine flow path.

The invention claimed is:

1. A turbine assembly, comprising:

a first platform and a second platform, the first platform and second platform forming a section of a main fluid path;

a plurality of aerofoils, each of the plurality of the aerofoils extending between the first platform and the second platform; and an impingement plate;

wherein the second platform has a surface opposite to the main fluid path with a plurality of recesses, wherein the plurality of the recesses is surrounded by a raised edge, wherein the raised edge provides a support for the mountable impingement plate, wherein the raised edge includes a first closed loop surrounding a first recess of the plurality of the recesses and surrounds a first aperture of a first aerofoil of the plurality of the aerofoils, and a second closed loop surrounding a second recess of the plurality of the recesses and surrounds a second aperture of a second aerofoil of the plurality of the aerofoils, wherein a portion of the raised edge defines a continuous barrier between the first recess and the second recess for blocking cooling fluid, and wherein the barrier forms a mating surface for a central area of the impingement plate, and wherein at least one of:

the first aperture has an elevated first rim which is configured with a height less than a height of the raised edge, and the second aperture has an elevated second rim which is configured with a height less than the height of the raised edge.

2. The turbine assembly according to claim 1, wherein the raised edge has a flat surface, wherein the flat surface is located in a cylindrical plane to form a mating surface for the impingement plate.

3. The turbine assembly according to claim 1, wherein the first platform, the second platform and the plurality of the aerofoils are integral in a single piece turbine nozzle guide vane segment.

4. The turbine assembly according to claim 1, wherein the first recess comprises at least one first aperture for cooling an interior of the first aerofoil and/or the second recess comprises at least one second aperture for cooling an interior of the second aerofoil.

5. The turbine assembly according to claim 1, wherein the first platform is configured in form of a section of a first cylinder and the second platform is configured in form of a section of a second cylinder, the second cylinder being arranged co-axially to the first cylinder about an axis, and the first and the second platforms each has an axial dimension and a circumferential dimension.

6. The turbine assembly according to claim 5, wherein the raised edge comprises a first elevation in circumferential direction, a second elevation in circumferential direction, a third elevation in axial direction and a fourth elevation in axial direction, wherein the first elevation, the second elevation, the third elevation and the fourth elevation form a mating surface for a border area of the impingement plate.

7. The turbine assembly according to claim 5, wherein the barrier is directed in axial direction.

8. The turbine assembly according to claim 7, wherein the barrier comprises a bend, the bend being parallel to an orientation of at least one of the first aerofoil and of the second aerofoil of the plurality of the aerofoils.

9. The turbine assembly according to claim 5, wherein the second platform comprises a first flange in direction of a first axial end of the second platform and a second flange in direction of a second axial end of the second platform, the barrier substantially spanning between the first flange and the second flange.

10. The turbine assembly according to claim 1, wherein the raised edge only provides the support to the impingement plate.

11. A gas turbine engine, comprising:

at least one guide vane ring; and a turbine assembly, comprising:

a first platform and a second platform, the first platform and second platform forming a section of a main fluid path;

a plurality of aerofoils, each of the plurality of the aerofoils extending between the first platform and the second platform; and an impingement plate;

wherein the second platform has a surface opposite to the main fluid path with a plurality of recesses, wherein the plurality of the recesses is surrounded by a raised edge, wherein the raised edge provides a support for the mountable impingement plate, wherein the raised edge includes a first closed loop surrounding a first recess of the plurality of the recesses and surrounds a first aperture of a first aerofoil of the plurality of the aerofoils, and a second closed loop surrounding a second recess of the plurality of the recesses and surrounds a second aperture of a second aerofoil of the plurality of the aerofoils, wherein a portion of the raised edge defines a continuous barrier between the first recess and the second recess for blocking cooling fluid, and wherein the barrier forms a mating surface for a central area of the impingement plate, and wherein at least one of the first aperture has an elevated first rim which is configured with a height less than a height of the raised edge, and the second aperture has an elevated second rim which is configured with a height less than the height of the raised edge;

wherein the at least one guide vane ring and the turbine assembly define an annular fluid path for a main fluid flow.

12. The gas turbine engine according to claim 11, wherein a first space defined by the first recess and an opposing impingement plate is in fluid communication with a hollow body of the first aerofoil of the plurality of the aerofoils, and a second space defined by the second recess and the opposing impingement plate is in fluid communication with a hollow body of the second aerofoil of the plurality of the aerofoils.

13. The gas turbine engine according to claim 12, wherein at least one of the first space and the second space are free of passages through the second platform into the main fluid path.

* * * * *